United States Patent Office 3,184,492
Patented May 18, 1965

3,184,492
PROCESS FOR THE PREPARATION OF SODIUM ALUMINUM METHOXY HYDRIDE
Marc Cole, Bayonne, N.J., assignor to Hoffmann-La Roche, Inc., Nutley, N.J., a corporation of New Jersey
No Drawing. Filed Feb. 5, 1963, Ser. No. 256,257
4 Claims. (Cl. 260—448)

The present invention relates to a reducing agent. More particularly, the invention relates to sodium aluminum methoxy hydride and to a process for its preparation.

It has now been found that sodium aluminum methoxy hydride is a very effective reducing agent useful in the same manner as lithium aluminum hydride. Additionally, the present reducing agent has the important advantage of being inexpensive and very easy to manufacture.

Sodium aluminum methoxy hydride can be prepared by any of three methods:

(a) By reacting aluminum, sodium methylate, and optionally, a di-lower alkyl aluminum hydride, under hydrogenation conditions to form sodium aluminum methoxy hydride directly. This process is a very simple one-step process employing inexpensive reactants. The reaction is carried out using from about 29 to about 39 percent by weight, preferably from about 32 to about 35 percent by weight, of aluminum powder, from about 51 to about 70 percent by weight, preferably from about 58 to about 64 percent by weight, of sodium methylate, and optionally, from about 1 to about 7 percent by weight, preferably from about 1.6 to about 4 percent by weight, of a di-lower alkyl aluminum hydride, e.g., diisobutyl aluminum hydride, and hydrogenating the mixture in the presence of an organic solvent, e.g., tetrahydrofuran, hexane, etc., in the presence of hydrogen gas, at a pressure in a range of from about 750 p.s.i. to about 2500 p.s.i., preferably from about 1800 p.s.i. to about 2200 p.s.i., and at a temperature in the range of from about 130° to about 160° C., preferably about 150° C., until the theoretical quantity of hydrogen (or a quantity close to this) is taken up. The percentages by weight given above are based on the total weight of the aluminum metal plus the sodium methylate plus the hydrogen used up by the reaction;

(b) By reacting aluminum chloride with an approximately equimolar quantity of sodium methoxide to form sodium chloride and aluminum methoxy chloride (Al[OCH$_3$]Cl$_2$), and then reacting one mole of the latter compound with about three moles of sodium hydride to yield sodium aluminum methoxy hydride; and (c) By reacting an approximately three molar ratio of lithium aluminum hydride per mole of aluminum chloride to form lithium chloride and aluminum hydride, and reacting the latter compound with an approximately equimolar quantity of sodium methylate to form sodium aluminum methoxy hydride.

The reaction in (b) and (c) are preferably carried out in the presence of an inert solvent in which the non-aluminum halide is substantially insoluble and the other components are at least partially soluble, e.g., tetrahydrofuran, tetrahydropyran, etc., and preferably in the presence of an inert atmosphere, e.g., in an anhydrous nitrogen atmosphere.

The reducing agent of the invention, sodium aluminum methoxy hydride, can be written as NaAl(OCH$_3$)H$_3$. Alternatively, it can be written as NaOCH$_3$·AlH$_3$, although it is to be understood that both these formulas refer to the same compound. For the purposes of the invention, the formula NaAl(OCH$_3$)H$_3$ will be used hereinafter.

Sodium aluminum methoxy hydride is preferably stored with the exclusion of oxygen and moisture to prevent decomposition and/or spontaneous combustion.

Sodium aluminum methoxy hydride is useful as a reducing agent for reducing a wide variety of compounds including many which are very difficult to reduce; for example, sodium aluminum methoxy hydride can be used to reduce compounds containing a carboxyl group, e.g., aliphatic and aromatic carboxylic acids and esters to their corresponding alcohols. It can be used to reduce other compounds containing a carbonyl functional group such as ketones, aldehydes, quinones, etc., to their corresponding alcohols; compounds having a reducible nitrogen-containing functional group such as aliphatic nitro compounds and aliphatic and aromatic nitriles to primary amines; saturated and unsaturated aliphatic and araliphatic hydrocarbon halides to their corresponding saturated or unsaturated hydrocarbons, e.g., methyl iodide to methane, phenyl bromide to benzene, benzyl chloride to toluene, etc.; aromatic nitro or nitroso compounds to azo compounds; etc. Also like lithium aluminum hydride, sodium aluminum methoxy hydride is useful in selective reductive reactions. A reducible functional group can generally be reduced without the simultaneous reduction of a double bond, tripple bond, and/or aromatic ring. However, in some instances, where, for example, the unsaturated group is activated by its position relative to other functional groups, the unsaturated link may be reduced.

The reducing agent of the invention can be employed, for example, in the preparation of compounds of the formula

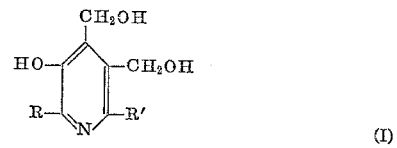

(I)

wherein R is lower alkyl and R' is hydrogen or lower alkyl, by reacting a compound of the formula

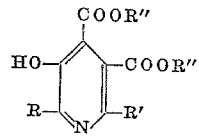

wherein R and R' have the above meaning and R" is a lower alkyl group with sodium aluminum methoxy hydride and isolating a compound of Formula I from the reaction mixture.

The invention in one of its aspects relates to the reduction of a chemical compound containing a reducible functional group including an atom other than hydrogen or carbon as, for example, those given above, with sodium aluminum methoxy hydride. The reduction reactions are preferably carried out in an anhydrous solvent, preferably in a cyclic or acyclic ether such as, e.g., tetrahydrofuran, tetrahydropyran, diethyl ether, etc. The temperature of reduction is not critical, although temperatures which cause a substantial decomposition of a reactant product and/or the reducing agent should of course not be employed. In general, temperatures in the range of about −10° C. to about 80° C., preferably about 10° C. to about 40° C., can be employed. In carrying out the reductions, it has been found desirable to employ the sodium aluminum methoxy hydride in finely divided state, e.g., from about 200 mesh to about 400 mesh, or even finer. The finely divided state can be obtained by the use of conventional methods such as by ball milling in an inert atmosphere.

In most of the reductions of organic compounds, the initial reduction product consists of sodium and aluminum salts of complexes of the desired product, e.g., where the ultimate products are alcohols or amines. It is therefore desirable to decompose the salt or complex first formed by hydrolysis with water, aqueous acids, e.g., aqueous mineral acids, preferably hydrochloric acid or aqueous bases to obtain the final reduction products.

In the specification and claims the terms "lower alkyl" or "lower alkyl group" mean a $C_1$ to $C_7$ alkyl group which can be either straight or branched chain, e.g., methyl, ethyl, propyl, butyl, hexyl, isobutyl, etc.

The practice of the invention can be better appreciated from the following examples which are, however, given for illustration purposes only and are not meant to limit the invention.

EXAMPLE 1

*Preparation of sodium aluminum methoxy hydride*

30 g. of aluminum powder is slurried under a nitrogen atmosphere with 200 ml. of anhydrous tetrahydrofuran. The mixture is filtered, the aluminum powder washed on the filter with 300 ml. of tetrahydrofuran, and charged into a steel ball mill, to which is added 135 ml. of tetrahydrofuran. The mill is shaken for 17 hours in a paint conditioner. The contents of the mill are poured under nitrogen into a 300 ml. glass liner and rinsed with tetrahydrofuran. Then 54 g. of sodium methylate and 9 g. of a 25 percent solution of diisobutyl aluminum hydride in hexane is added. The liner, in a shaking autoclave, is flushed with hydrogen, filled to 1800 pounds pressure with hydrogen, and shaken while heating to 150° C. After three hours the hydrogen uptake equals 98 percent of theory, and the autoclave is cooled. The contents are poured under nitrogen into a flask and evaporated to dryness at atmospheric pressure and finally under vacuum at room temperature to constant weight. 88.7 g. of sodium aluminum methoxy hydride in the form of a dark gray powder is obtained.

EXAMPLE 2

25.2 g. of sodium aluminum methoxy hydride prepared in Example 1 is mixed with 112 ml. of dry tetrahydrofuran and the mixture milled overnight in a steel ball mill. The resulting suspension is then removed from the ball mill into a flask and 45 g. of ethyl benzoate added thereto in small amounts. The temperature rises from 27° to 83° C. during the addition of the ethyl benzoate. After completion of the addition, the mixture is cooled to 50° C. and stirred for four hours while allowing the mixture to cool to room temperature. The solvent is removed in vacuo, the residual paste taken up in 100 ml. of diethyl ether and water was cautiously added thereto. Then 5 percent hydrochloric acid is added until a clear aqueous phase results. The ether layer is separated and the aqueous phase re-extracted twice, each time with 50 ml. of ether. The combined ether extracts are washed with sodium bicarbonate solution and water, dried over sodium sulfate, and filtered. The ether is then removed under vacuum to give 36 g. of an oily residue. The product is fractionated and the main fraction distilled at 101° to 103° C./10 mm. mercury to yield 27.7 g. of benzyl alcohol.

EXAMPLE 3

The method of reduction employed for the starting materials given in the table below is as follows:

In each reduction the procedure is the same except that the quantity of starting material, quantity of sodium aluminum methoxy hydride, quantity of tetrahydrofuran, and the reduction product is that given in the table: Sodium aluminum methoxy hydride is milled in a ball mill under nitrogen in tetrahydrofuran for eighteen hours and the fine suspension is added to a flask equipped with a stirrer, dropping funnel, and calcium chloride tube. To the stirred suspension held at a temperature of from 20° to 25° C. with external cooling is added slowly from a dropping funnel a solution of the starting material in 20 ml. of tetrahydrofuran. After all the starting material is added, the stirring is maintained at 20° to 25° C. for an additional two hours. Then a saturated solution of hydrogen chloride in ethanol is added to the reaction mixture until a test on moist Congo red paper showed an excess of hydrogen chloride to be present. The mixture is then stirred for another hour and centrifuged. The product is isolated by adding a solution of sodium hydroxide in ethanol to the reduction mixture and isolating the product by extraction with ether and distillation of the ether leaving the product as a residue.

TABLE

| Starting material | Grams of starting material | Grams of $NaAl(OCH_3)H_3$ | Tetrahydrofuran, mls. | Reduction product |
|---|---|---|---|---|
| Methyl ethyl ketone | 2.1 | 3.3 | 55 | n-Butanol. |
| Benzaldehyde | 3.1 | 3.3 | 55 | Benzyl alcohol. |
| Benzoic acid | 3.6 | 6.5 | 109 | Do. |
| Benzonitrile | 3.1 | 7.3 | 91 | Benzylamine. |
| Benzyl chloride | 5.7 | 5.5 | 68 | Toluene. |
| Benzoic anhydride | 6.8 | 14.4 | 180 | Benzyl alcohol. |
| Benzoyl chloride | 4.2 | 7.3 | 91 | Do. |

EXAMPLE 4

12 g. of finely divided sodium aluminum methoxy hydride suspended in 150 ml. of anhydrous tetrahydrofuran is charged into a flask fitted with a stirrer and protected by a dry nitrogen atmosphere. The suspension is heated to 35° C. and to it is slowly added, over one hour, a solution of 10 g. of 2-methyl-3-hydroxy-4,5-dicarbethoxypyridine in 20 ml. of anhydrous tetrahydrofuran with constant stirring, while maintaining the temperature at 35° C. After an additional hour of stirring at 35° C., the excess hydride is destroyed by careful addition of 10 ml. of water in 20 ml. of tetrahydrofuran. 135 ml. of concentrated aqueous hydrochloric acid is added and the mass cooled with stirring for two hours at 0° C. The precipitated pyridoxine is filtered and washed with 100 ml. of tetrahydrofuran and dried at 50° C.

If desired, the product can be further purified according to the process of copending application Serial No. 256,293, filed February 5, 1963, for Gerald Myer Jaffe and Edward John Pleven, entitled "Process."

I claim:

1. A process for the preparation of sodium aluminum methoxy hydride comprising reacting together sodium methylate, aluminum powder, and hydrogen.

2. A process according to claim 1 wherein from about 51 to about 70 weight percent of sodium methylate and from about 29 to about 39 weight percent of aluminum powder is employed, based on the total weight of the sodium methylate, aluminum powder, and the hydrogen used up by the reaction.

3. A process according to claim 1 wherein from about 58 to about 64 weight percent of sodium methylate and from about 32 to about 35 weight percent of aluminum is employed.

4. A process according to claim 3 wherein the reaction is carried out in the presence of a minor amount of a di-lower alkyl aluminum hydride.

References Cited by the Examiner

UNITED STATES PATENTS

| | | | |
|---|---|---|---|
| 2,897,203 | 7/59 | Carrara et al. | 260—297.5 |
| 2,918,471 | 12/59 | Mowat et al. | 260—297.5 |

FOREIGN PATENTS

| | | |
|---|---|---|
| 268,690 | 9/50 | Switzerland. |
| 629,450 | 9/49 | Great Britain. |
| 839,583 | 6/60 | Great Britain. |
| 878,136 | 9/61 | Great Britain. |

OTHER REFERENCES

Moeller, "Inorganic Chemistry," pp. 786–7 (Wiley) (1952).

WALTER A. MODANCE, *Primary Examiner.*

NICHOLAS S. RIZZO, *Examiner.*